June 12, 1934.　　　　C. T. McGILL　　　　1,962,663
WATER SOFTENER
Filed May 17, 1928　　　2 Sheets-Sheet 1

Inventor
Chester T. McGill
By Mason Fenwick & Lawrence
Attorneys

June 12, 1934.   C. T. McGILL   1,962,663
WATER SOFTENER
Filed May 17, 1928   2 Sheets-Sheet 2

Inventor
Chester T. McGill
By Mason Fenwick Lawrence
Attorneys

Patented June 12, 1934

1,962,663

UNITED STATES PATENT OFFICE 1,962,663

WATER SOFTENER

Chester T. McGill, Elgin, Ill.

Application May 17, 1928, Serial No. 278,559

5 Claims. (Cl. 210—24)

This invention relates to improvements in water softeners, particularly over the applicant's patent, No. 1,661,488.

One of the principal objects of this invention is to provide a water softener in which bed blowing may be eliminated.

Another object is to distribute the brine solution in a diluted solution for efficiently regenerating the base exchange mineral with the least amount of brine solution.

Another object of this invention is to provide a base exchange water softener in which the full capacity of the tank above the distributing material is used for the base exchange mineral.

Another object is to provide means for diluting the brine solution within the distributing material before it passes into the zeolite or base exchange mineral.

A further object of this invention is to provide a plurality of strainer nozzles so positioned within the tank that they will function to allow the softened water to pass from the top of the tank and retain the base exchange mineral.

Another object of this invention is to provide a means for extracting the air from the top portion of the tank.

This invention also provides a seatless water flow regulator, which functions to regulate a given number of gallons of water per square foot of softening base exchange mineral.

Another object is to regulate the flow of brine solution through the base exchange mineral so as to most efficiently regenerate the mineral.

Other objects of this invention will appear from the following detailed description of the device, and as clearly disclosed in the two sheets of drawings which are herewith made a part of this application.

In the drawings—

Fig. 5 illustrates a sectional view of a portion of distributing material disclosing laterals and manifold extending there through.

Figures 1, 2:
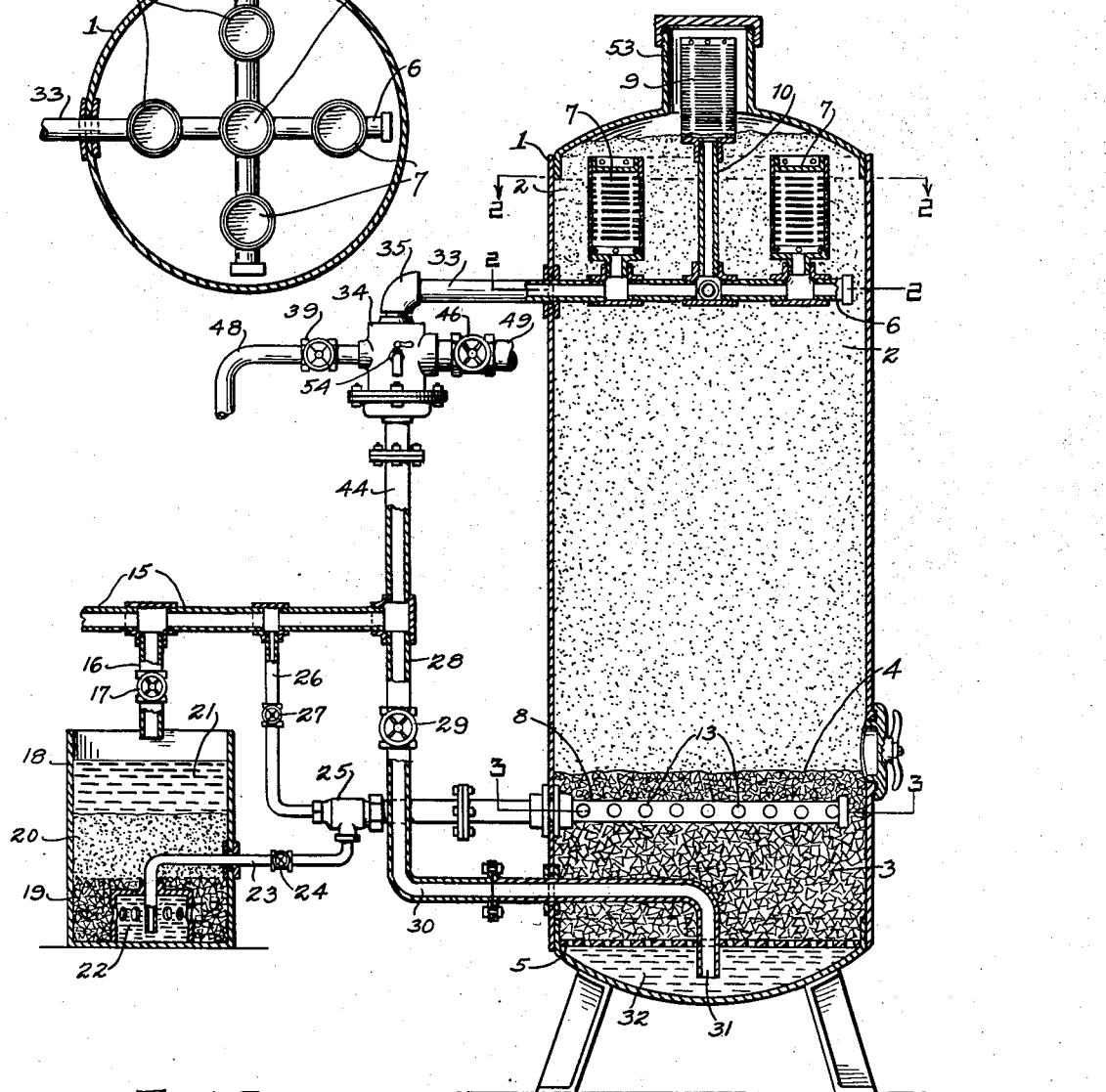
Fig. 1 illustrates a vertical sectional view of the water softener, disclosing the various members in assembled and operative relationship
Fig. 2 represents a sectional view of Figure 1, taken along line 2—2.
Figure 6:
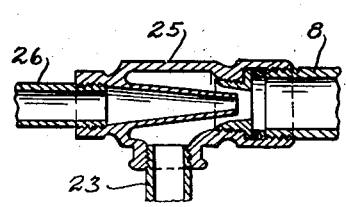
Fig. 6 represents a sectional view of the ejector.

In the water softener, according to this invention, it is preferred that numeral 1 designate a tank member, made of any suitable material such as rolled steel, tank steel, or the like, and adapted to receive therein a base exchange mineral 2, of zeolite mineral, or otherwise, adapted to be supported therein upon distributing material 4, which in turn is supported upon a coarser distributing material 3. The distributing material used in this invention may be of any suitable type, preferably machine cut quartz or granite.

A perforated plate 5 is securely positioned near the base of the tank for supporting the distributing materials 3 and 4, as well as the zeolite mineral 2.

Near the top of the tank 1 is positioned a soft water and brine discharge manifold 6, having extending therefrom in open communication a plurality of strainer nozzles 7, for the purpose of allowing the softened water to pass out into service lines without carrying the zeolite mineral from the tank, also for passing the brine solution and calcium from the manifold 6, without carrying the base exchange mineral from the tank 1.

Extending from the top manifold 6 and in open communication therewith, is a strainer member 9, connected to the manifold 6, by means of a lead 10, which functions the same as strainer 7, and in addition removes the accumulated air from space 53 at the top of the tank 1.

In the lower portion of the tank 1 and firmly imbedded in the distributing material 3, is a brine inlet manifold and distributing material support 8, having extending therefrom lateral members 13, which are provided with a plurality of perforations or slots 14.

Figure 5:
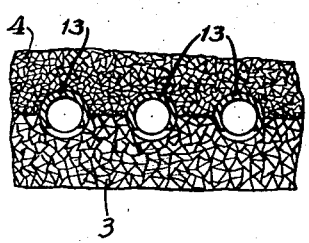

Figure 5 illustrates clearly the manner in which the brine inlet manifold and laterals extending therefrom, are imbedded in the distributing material 3, the coarser type of distributing material 3 being firmly packed between and around the laterals 13, forming a bridge work, together with the finer distributing material 4, which has been found to prevent the customary bed blowing in zeolite water softeners.

The material 3 is preferably machine cut quartz, the edges of the quartz functioning to build an arch way from the laterals 13, thereby making a bridge work or support, and preventing the inrushing water from displacing the bed or causing the eruption thereof.

It has been found that the bed of the zeolite water softeners becomes matted in a portion of the distributing material, thereby creating a greater resistance at this point when sudden demand arises which causes a greater amount of water to pass through the distributing material.

This portion of the bed which has the least resistance, often gives way, carrying with it the gravel and distributing material up into the base exchange mineral, thereby losing the effect of the proper distribution of the water during the softening periods, and the waste of zeolite mineral during the regenerating periods.

Numeral 15 designates a raw water supply in open communication with by-pass 16, and a raw water supply valve 17, the by-pass 16 extending in open communication into a brine tank 18, which is adapted to receive a gravel portion 19 for supporting a salt bed 20, the liquid or raw water being carried above the salt bed 20, as disclosed at 21.

A brine suction box 22 is adapted to be located within the tank 18 at a point clearly disclosed in Figure 1, for the purpose of siphoning the brine solution from the tank 18, through a suction line 23, and a brine control valve 24.

Leading from the raw water line 15 is a bi-pass 26 provided with a raw water control valve 27 for controlling the water supply to an ejector 25, which functions for the purpose of siphoning the brine water through the valve 24 and line 23 into the manifold 8.

A raw water supply line 28, having therein a control valve 29, is provided for the purpose of supplying raw water, as may be desired, through a line 30, and an opening 31, into a space 32 at the bottom of the tank 1.

Figure 4:
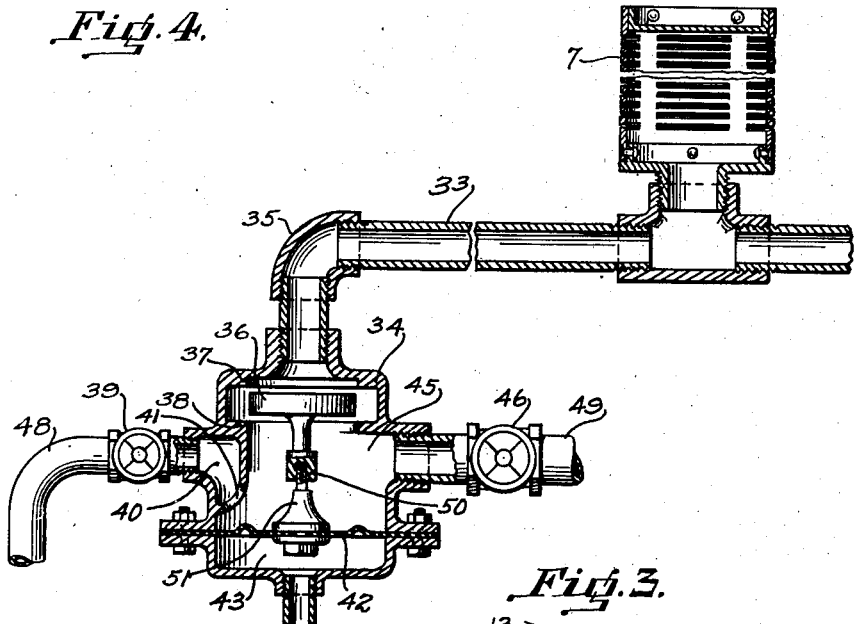
Fig. 4 illustrates a sectional view of the seatless control valve in operative relationship with a sectional view of a strainer member.
Figure 3:
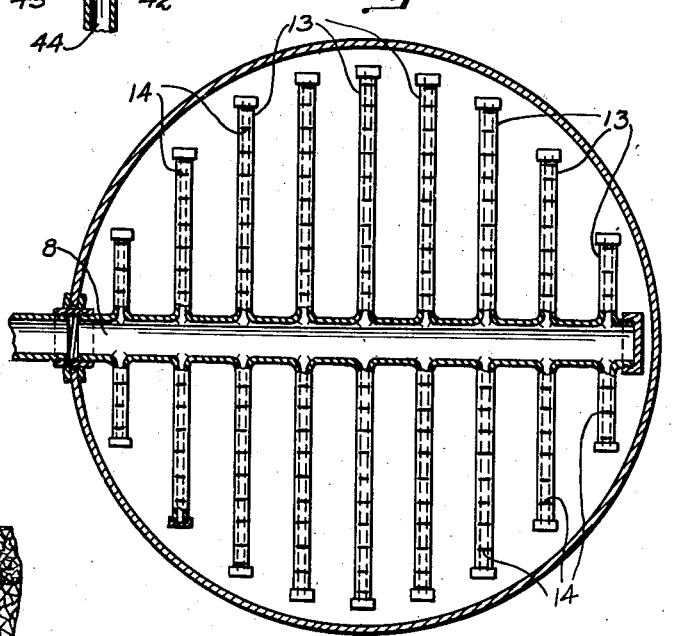
Fig. 3 illustrates a sectional view to an enlarged scale of Figure 1, taken along line 3—3.

Leading from the top manifold 6 is an outlet 33 for the soft water and brine solution, which delivers into control valve 34 through an elbow portion 35. The operation of the control valve 34 is clearly disclosed in Figure 4, wherein numeral 36 designates the flow rate controller plunger, while 37 and 38 designate the ports of the control valve, and numeral 39 is a brine outlet valve in the discharge drain 48.

The numeral 40 designates a brine waste space within the valve, which functions to receive the brine solution through an opening 41, while numeral 42 designates a diaphragm which functions to separate the raw water pressure space 43 from the soft water space 45, the raw water pressure space being in open communication with a line 44 leading to the raw water supply 15.

A soft water discharge line 49, provided with a soft water control valve 46, extends from the soft water space 45.

The numeral 50 designates an adjusting nut for the flow rate controller plunger, while numeral 51 designates the connecting element between the diaphragm and the regulating controller plunger.

In the operation of the softener, the control valve 34 functions to regulate the flow of water, which is regulated by the pressure of the raw water to line 44 and the pressure of the soft water in the space 45.

For illustration, the incoming water from the raw water line 15 might have a working pressure of 60 pounds, whereby, the pressure in space 43 would be approximately 60 pounds.

The water passing into the bottom of the softener space 32 would also have a pressure of a little less than 60 pounds, but as the water passes upwardly through the distributing material 3 and 4, and zeolite mineral 2, there is a loss in pressure, and as the water passes into the strainer nozzles 7 and 9, there is a still greater loss in pressure.

Under normal operation, when water is being drawn through valve 46 at the rate of eight gallons per square foot, the relation between pressure in space 43 and space 45 functions to operate the controller plunger 36, with ports 37 and 38 to maintain not to exceed an eight gallon rate of flow per minute. When the pressure is further reduced in space 45 by opening valve 46 still wider, or a number of leads are opened from line 49, that would maintain a supply of water faster than 8 gallons per square foot, the pressure would be reduced enough more at space 45 to cause the 60 pound pressure in space 43 to raise the diaphragm 42, thereby raising the controller plunger 36 nearer to the port 37, thereby maintaining a flow not to exceed eight gallons per square foot.

The controller plunger 36 is made in different sizes so as to give different flow rates, according to different working pressures.

In brining the controller plunger 36 works the same as in softening processes. As the valve 46 is closed, valve 39 is opened.

In the softening operation all the valves are closed excepting valves 29 and 46. This allows the raw water to enter through lines 15 and 28, valve 29, line 30, and discharge through 31 into space 32, where the water is carried through a perforated plate 5, up through distributing bed 3 and 4, zeolite mineral 2, out through strainer nozzles 7 and 9, into manifold 6, line 33, control valve 34, valve 46 and line 49.

A sufficient amount of salt is placed in the brine tank 18, as disclosed at 20. Raw water is admitted through valve 17 to fill the brine tank 18, as disclosed at 21.

To regenerate, valve 46 is closed, valve 29 is closed except for one to two turns. Then valve 39 is opened. Valve 27 is opened and valve 24 is opened. This allows the raw water to pass through ejector 25, siphoning brine solution from brine tank 18, through valve 24, and hence to the manifold 8 and the laterals 13. At the same time that the brine solution is passing from the brine tank 18 to the manifold 8, there is a given amount of raw water passing valve 29 into the space 32, passing up from the distributing materal 3, thereby diluting the brine solution as it passes from manifold 8, and diluting as nearly as possible to a five per cent brine solution, and then passing up through the zeolite mineral 2, out through the strainers 7 and 9, line 33, control valve 34, valve 39, and waste drain 48.

As soon as the correct amount of brine solution has been taken from brine tank 18, valves 24 and 27 are closed, the raw water is allowed to continue to pass through valve 29, line 30 and 31 into space 32, up through the distributing material, zeolite mineral and out through the strainer nozzles, through the control valve 34, to the waste drain 48. As soon as a sample of water taken from pet cock 54 tests soft by standard soap solution, valve 39 is closed and valves 29 and 46 are opened wide, and the softener is again in operation.

In draining the control valve 34, the opening 41 in the brine space 40 is low enough so as to siphon the greater per cent of the water from the soft water space 45, thereby preventing the freezing and bursting of a control valve or diaphragm. The amount of water remaining in this control valve 34 would not be sufficient to expand and do damage.

The water softener, according to this invention, provides a means for utilizing all the tank space, thereby effecting a greater softening capacity for a given amount of space, which has been found very important in certain installations, where room is of vital importance; economy in making a softener that would regenerate the greatest amount of zeolite with a given amount of salt, which is accomplished by the proper diluting of the brine solution within the softener tank; the preventing of bed blowing, due to the construction of the manifold within the distributing bed and the flow regulator valve, thereby saving a vast expense in repairs and replacement over other water softeners; simplicity in regenerating, which is accomplished without back washing and manipulating a large number of valves.

The construction of a softener with strainer nozzles makes it possible to utilize the entire space of the softener tank without liability of the loss of zeolite mineral during softening or regenerating periods.

This softener operates upwardly when furnishing softened water, and upwardly when regenerating, and at no time is there a supply of water under pressure in a downward current which would have a tendency to pack the mineral, thereby effecting the full efficiency of the mineral.

It will be understood that the control valve is intended to operate on regulating flow of liquid for other purposes than in a base exchange water softener.

The control valve will work equally as well in water filters where a given rate of flow is required and where variation in pressure influences the operation of a filter.

The rate control valve also is used for passing liquids where a steady rate of liquid is essential and wherein variation of pressure is caused by sudden demands for liquids leading to other lines than that portion that flows through the control valve.

The control is regulated by connecting the space 43 with the line 44 to the main supply or pressure of the liquid, and connecting the discharge of said liquid where it is desired to have a regulating flow regardless of variation in pressure at line 49 under control of valve 46.

It is understood that alterations and substitutions may be made in the above disclosure both in the specifications and drawings within the scope of the appended claims without affecting the merits of this invention.

What I claim is:

1. In a water softener a tank, base exchange mineral, and distributing material in the tank, means for preventing bed-blowing comprising a grid of liquid distributing conduits embedded in the distributing material, means for eliminating the waste of base exchange mineral, means for preventing channelling, means for introducing brine into the softener tank, and means for adding a diluting fluid to the brine solution within the softener tank, simultaneously with the admission of the brine and independently thereof.

2. In a water softener a tank, base exchange material and distributing material in said tank, means for preventing bed blowing and channeling, means for eliminating the waste of base exchange material, means for admitting brine to the tank, other means for admitting water to the tank simultaneously with the admission of brine for diluting the brine within the tank and means for trapping and disposing of air with the liquid as it flows from the softener tank.

3. In a base exchange water softener, the combination of a container, base exchange material therein, means including pipes extending into said container and having a plurality of outlets for introducing into said container at a given point above the bottom thereof material for regenerating said base exchange material, and means having an outlet at a point below said given point for introducing into said container through said outlet a fluid for raising said regenerating material up through said base exchange material.

4. A method of regenerating base exchange material of a base exchange water softener including a supported gravel bed and base exchange material in turn supported thereby, which method consists in supplying a regenerating solution to a plurality of spaced points in said gravel bed and simultaneously supplying water at a point below said gravel bed and below the point of supply of said regenerating solution for raising said regenerating material upwardly through the entire body of said base exchange material.

5. In a base exchange water softener, the combination of a container, base exchange material therein, means having a plurality of outlets within said container for introducing into said container at a given point above the bottom thereof material for regenerating said base exchange material, and means for introducing into said container at a point below said given point a fluid for raising said regenerating material up through said base exchange material, and a perforate partition between said two connections for causing the flow of water to be substantially uniform across said container.

CHESTER T. McGILL.